United States Patent
Hamahata et al.

(10) Patent No.: US 7,357,822 B2
(45) Date of Patent: *Apr. 15, 2008

(54) FILTER CONTROL APPARATUS (75) Inventors: Toshihiro Hamahata, Saitama (JP); Tomonori Watanabe, Saitama (JP)

(73) Assignee: Bosch Automotive Systems Corporation (JP)

( * ) Notice: Subject to any disclaimer, the term of this patent is extended or adjusted under 35 U.S.C. 154(b) by 285 days.

This patent is subject to a terminal disclaimer.

(21) Appl. No.: 10/492,349

(22) PCT Filed: Aug. 8, 2003

(86) PCT No.: PCT/JP03/10130
§ 371 (c)(1),
(2), (4) Date: Sep. 9, 2004

(87) PCT Pub. No.: WO2004/016916
PCT Pub. Date: Feb. 26, 2004

(65) Prior Publication Data
US 2005/0016137 A1    Jan. 27, 2005

(30) Foreign Application Priority Data
Aug. 13, 2002   (JP) .............................. 2002-235854

(51) Int. Cl.
*B01D 46/00* (2006.01)
*F01N 3/023* (2006.01)

(52) U.S. Cl. ...................... 55/283; 55/282.2; 55/282.3; 55/385.3; 55/523; 55/DIG. 10; 55/DIG. 30; 60/274; 60/311; 95/19; 95/20; 95/273; 96/421

(58) Field of Classification Search ............... 55/282.2, 55/282.3, 283, 385.3, 523, DIG. 10, DIG. 30; 60/274, 295, 297, 311; 95/19, 20, 273, 278; 96/421
See application file for complete search history.

(56) References Cited

U.S. PATENT DOCUMENTS

| 5,195,316 | A  | * | 3/1993  | Shinzawa et al. ............. | 60/274  |
| 6,090,187 | A  | * | 7/2000  | Kumagai .................... | 55/282.3 |
| 6,622,480 | B2 | * | 9/2003  | Tashiro et al. ............... | 60/311  |
| 6,907,873 | B2 | * | 6/2005  | Hamahata .................... | 60/311  |
| 6,941,750 | B2 | * | 9/2005  | Boretto et al. ............... | 60/311  |
| 6,952,920 | B2 | * | 10/2005 | Shirakawa ................... | 60/311  |
| 7,062,907 | B2 | * | 6/2006  | Kitahara ..................... | 60/311  |
| 7,065,960 | B2 | * | 6/2006  | Gioannini et al. ............ | 60/311  |

FOREIGN PATENT DOCUMENTS

| GB | 2 239 407 A |   | 7/1991 |
| JP | 3-199616    |   | 8/1991 |
| JP | 7-83026     | * | 3/1995 |
| JP | 7-317529    | * | 12/1995 |

* cited by examiner

Primary Examiner—Jason M. Greene
(74) Attorney, Agent, or Firm—Connolly Bove Lodge & Hutz LLP (57) ABSTRACT In order to calculate an estimation of the quantity of accumulated particulates in a filter (32), a first estimation calculation unit (100) that outputs first estimation data (XA) calculated from the filter before and after differential pressure, and a second estimation calculation unit (110) that outputs second estimation data (XB) based on the engine operation status. Of the first and second estimation data (XA, XB), the estimation data having the higher dependability, as viewed from the engine speed at that time, is selected, whether or not to regenerate the filter is determined and with the differential between the first and second estimation (XA, XB) also taken into consideration, when the differential is larger than a prescribed value, even if the engine speed is high, the first estimation data XA is not selected since there is a risk that the dependability of the estimation value is low due to cracking of the accumulated particulates.

11 Claims, 4 Drawing Sheets

FILTER CONTROL APPARATUS

TECHNICAL FIELD

The present invention relates to a filter control apparatus capable of regenerating, at a suitable timing, a filter for trapping particulates contained in exhaust gas discharged from an engine.

BACKGROUND ART

To suppress the atmospheric diffusion of particles contained in the exhaust gas of diesel engines, in recent years, various apparatuses are being developed for mounting in the exhaust system of diesel engines for after-treatment of diesel particulates in the exhaust gas. Exhaust gas treatment apparatuses of this type all include a filter for trapping particulates contained in the exhaust gas discharged from the diesel engine. Particulates trapped by the filter gradually accumulate and ultimately clog the filter, making it difficult for the exhaust gas to pass through the exhaust gas passage.

Conventionally, therefore, when it is estimated that the quantity of the accumulated particulates in the filter has reached a prescribed level, the filter is heated to elevate the filter temperature and burn the particulates, regenerating the filter so that it again can be used to trap particulates. It is therefore desirable to carry out filter regeneration at a suitable timing, using the means of burning the particulates by heating the filter.

Previously, wide use has been made of a filter regeneration control arrangement in which the quantity of accumulated particulates in the filter is estimated by measuring the before and after differential pressure of the filter, that is, the pressure differential between the exhaust gas pressure at the inlet end of the filter and the exhaust gas pressure at the outlet end of the filter, and determining the timing of the filter regeneration in accordance with the estimation result.

However, the above-described conventional technology has the following problem points. When the engine is operating at a low speed such as when it is idling or the like, the flow rate of the exhaust gas in the exhaust path decreases, which reduces the before and after differential pressure of the filter even when the quantity of accumulated particulates is small, making it difficult to estimate accurately the quantity of the accumulated particulates on the basis of the before and after differential pressure of the filter. Also, when the exhaust gas is in a low-pressure state, pressure sensor input/output characteristics that indicate the relationship between the exhaust gas pressure and the pressure sensor output signals are not linear. The precision of the pressure information possessed by the pressure sensor output signal therefore declines, and the level of the output signal from the pressure sensor also becomes lower and susceptible to noise, so pressure sensor characteristics problems also make it difficult to accurately estimate the quantity of accumulated particulates.

Furthermore, in cases such as when particulates have accumulated in the filter and the filter continues to be in a high-temperature state when engine operation has been stopped, volatile components released by the accumulated particulates in the filter produces cracking in the particulates. When such cracking occurs, exhaust gas passes through the cracked portion and inside the filter, reducing the air-flow resistance of the filter. As a result, the before and after differential pressure of the filter becomes smaller compared to before the occurrence of the cracking, and if in this state the exhaust gas differential pressure is used to estimate the quantity of accumulated particulates, it results in a reduced estimate of the quantity of accumulated particulates, making it difficult to accurately estimate the quantity of accumulated particulates.

As such, in previous apparatuses in which filter regeneration is controlled by measuring the before and after exhaust-gas differential pressure of the filter, regeneration is carried out in a state in which there is a large amount of accumulated particulates in the filter, which risks causing fusing damage to the filter. Due to the difficulty of accurately estimating the quantity of accumulated particulates, with higher filter regeneration frequency, there are also the problems of deterioration in fuel consumption and shortening of filter life.

An object of the present invention is to provide a filter control apparatus that is able to resolve the above-described problem points of the conventional technology.

DISCLOSURE OF THE INVENTION

To resolve the above-described problems, in a filter control apparatus that estimates the quantity of accumulated particulates in a filter for trapping particulates contained in engine exhaust gas and regenerates the filter based on the estimation result, a filter control apparatus according to the present invention that estimates an accumulated particulate quantity based on a before and after exhaust-gas differential pressure of the filter and also estimates an accumulated particulate quantity based on engine operation status, selectively extracts one of these two estimation results according to engine operation status and a result of a comparison of both estimation values, and based on the extracted estimation result, determines whether or not to carry out filter regeneration.

In a filter control apparatus that estimates the accumulated particulate quantity in a filter for trapping particulates contained in engine exhaust gas and regenerates the filter based on the estimation result, the present invention is characterized in that it includes detection means for detecting the engine operation status, first estimation means that estimates an accumulated particulate quantity of the filter based on a before and after exhaust-gas differential pressure of the filter, second estimation means that estimates an accumulated particulate quantity of the filter based on the engine operation status, and differential calculation means that calculates the differential of the accumulated particulate quantity estimation values obtained by the first and second estimation means, selects one of the estimation results of the first and second estimation means in response to the differential calculation means and detection means, and determines regeneration timing of the filter in accordance with the selected estimation result.

The second estimation means can be configured to perform calculation for estimating an accumulated particulate quantity based on at least one from among quantity of fuel injected to the engine, the engine speed, ratio of exhaust gas recirculation in the engine, and filter before temperature.

The second estimation means can also be configured to carry out estimation calculation of accumulated particulate quantity, using mapping calculation employing measured data obtained by measuring accumulated particulate quantity increase per unit time using an actual engine.

Estimated accumulated particulate quantity values used in filter regeneration control each time the engine is stopped can be stored and the stored accumulated particulate values used as initial values for integration in the second estimation means.

When selecting either of the estimation results of the first and second estimation means, sedimentary particulates can be estimated more accurately by calculating the amount of deviation between the two estimation results, storing the amount of deviation as a learning value and, in accordance with the learning value, correcting calculated values in the second estimation means.

In this case, a coefficient can instead be calculated in accordance with the amount of deviation and the coefficient used to correct calculated values in the second estimation means. It can be arranged so that when a deviation amount exceeds a prescribed value, the gist of that is displayed to the operator.

A configuration can be used whereby when the differential between the two estimation values when the engine is started equals or exceeds a prescribed value, the estimation result of the second estimation means is selected regardless of the detection result of the detection means.

It can also be arranged so that the estimation result of the second estimation means is selected within a prescribed time period regardless of the detection result of the detection means. The time from the starting of the engine to when the estimated accumulated particulate quantity reaches a prescribed value can be set as the prescribed time period.

It can be arranged so that in cases where the differential between the two estimation values goes below a prescribed value, the estimation result of the first estimation means is used instead of the estimation result of the second estimation means.

In accordance with the above configuration, one selected from estimated accumulated particulate quantity value obtained based on the before and after exhaust-gas differential pressure of the filter, and estimated accumulated particulate quantity value calculated from engine operation parameters or the like, is used selectively, taking into consideration the engine operation status and the differential between the two estimation values. The result of this is that it becomes possible to estimate the accumulated particulate quantity with higher precision, making it possible to determine a suitable filter regeneration timing with more accuracy.

BEST MODE OF CARRYING OUT THE INVENTION

In order to explain the present invention in greater detail, it will now be described with reference to the attached drawings.

Figure 1:
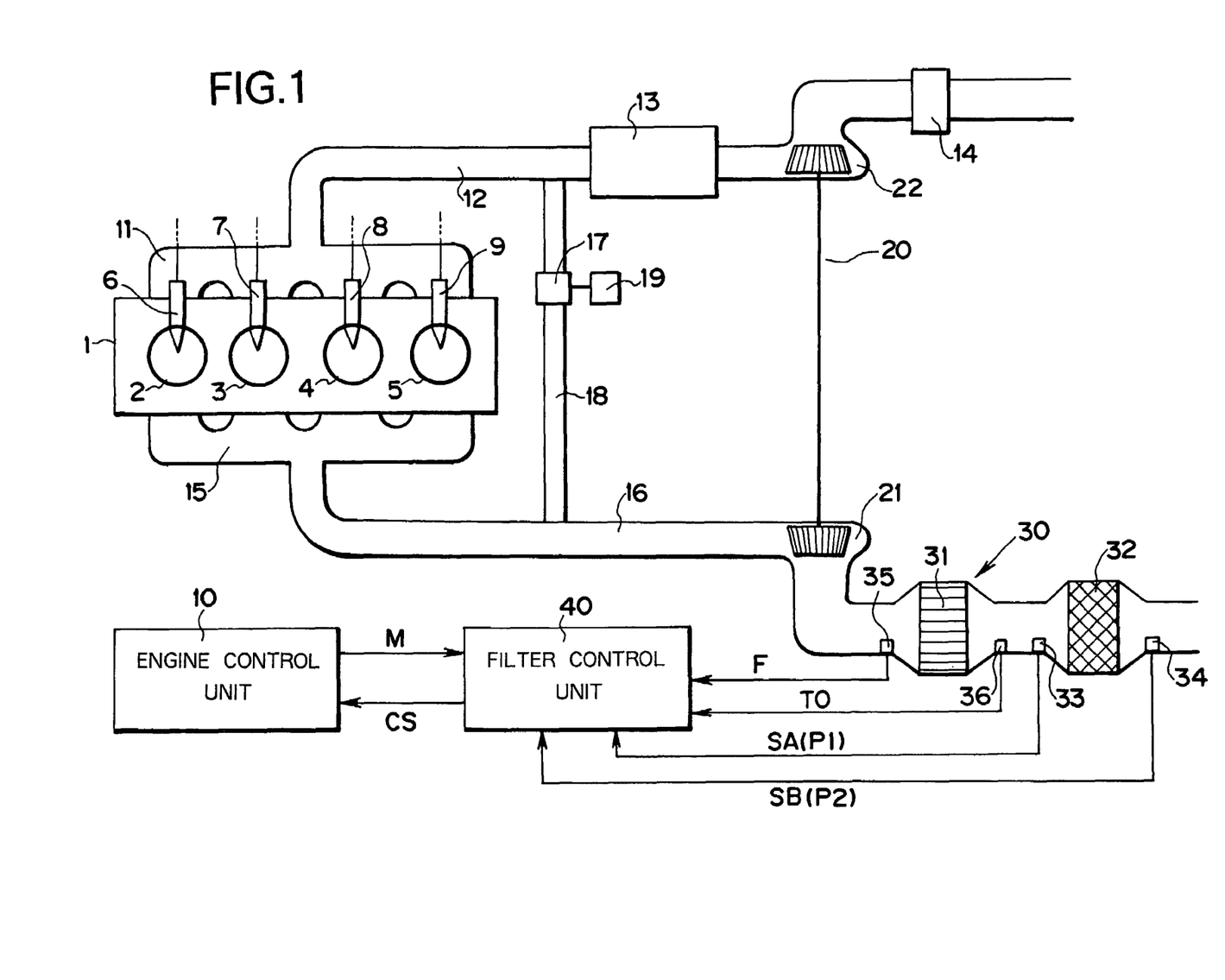
FIG. 1 is a schematic diagram showing an example of an embodiment of an exhaust gas treatment apparatus equipped with the filter control apparatus of the present invention.

FIG. 1 is an overall schematic diagram of an example of an embodiment of the present invention showing a case in which filter control is applied to after-treatment of the exhaust gas of a diesel engine. Symbol 1 denotes a four-cylinder diesel engine, the cylinders 2-5 of which are provided with injectors 6-9, respectively. The operation of these injectors 6-9 is controlled by an engine control unit 10, using a known arrangement to inject a required amount of high-pressure fuel, at a required timing, into the corresponding cylinder.

An intake duct 12 connected to an intake manifold 11 is provided with an inter-cooler 13 and an air cleaner 14. An exhaust duct 16 connected to an exhaust manifold 15 is provided with an exhaust gas after-treatment apparatus 30.

An exhaust recirculation channel 18 provided with an EGR control valve 17 is provided between the intake duct 12 and the exhaust duct 16, and the opening of the EGR control valve 17 is regulated by an actuator 19 controlled by the engine control unit 10, forming an arrangement whereby part of the exhaust gas flowing in the exhaust duct 16 can be metered and returned to the intake manifold 11. Symbol 20 denotes an exhaust turbocharger comprised of an exhaust turbine 21 disposed inside the exhaust duct 16 and a compressor 22 that is disposed inside the intake duct 12 and driven by the exhaust turbine 21.

The exhaust gas after-treatment apparatus 30 includes an oxidation catalyst 31 and a filter 32 for trapping particulates, and is arranged so that exhaust gas flowing in the exhaust duct 16 passes through the filter 32 after passing through the oxidation catalyst 31. The oxidation catalyst 31 is configured by forming a washcoat layer of activated alumina on the surface of a support constituted of, for example, honeycomb-structure cordierite or heat-resistant steel, and catalyst activated components constituted of precious metal such as platinum, palladium or rhodium or the like are then imparted to the coating layer. The oxidation catalyst is configured to oxidize NO in the exhaust gas to produce $NO_2$, and to also oxidize HC and CO in the exhaust gas to produce O and $CO_2$.

The filter 32 used is formed of porous cordierite or multiple cells of silicon carbide formed in parallel with cells with sealed inlets alternating with cells with sealed outlets, a so-called wallflow type honeycomb, or is a fiber type filter comprising layers of ceramic fibers wrapped around a perforated stainless-steel tube that traps particulates in the exhaust gas.

The inlet end (before) and outlet end (after) of the filter 32 are provided with first and second pressure sensors 33 and 34, respectively, for detecting each exhaust gas pressure. A first pressure signal SA that represents the exhaust gas pressure P1 at the inlet end of the filter 32 is output from the first pressure sensor 33, and a second pressure signal SB that represents the exhaust gas pressure P2 at the outlet end of the filter 32 is output from the second pressure sensor 34. Symbol 35 denotes a flow rate sensor for detecting the flow rate of the exhaust gas flowing in the exhaust duct 16. An exhaust gas flow rate signal F from the flow rate sensor 35 is input to a filter control unit 40, together with the first pressure signal SA and the second pressure signal SB.

Instead of using the flow rate sensor 35 to detect the flow rate, the exhaust gas flow rate can be calculated from the intake air flow, injection amount, exhaust temperature, exhaust pressure. In this case, the relational expression $$PV = nRT$$

(where P: pressure, V: volume, T: temperature, nR: gas coefficient) can be used to calculate the volumetric flow rate by calculating the volumetric time differential.

The filter control unit 40 is used to estimate the quantity of accumulated particulates trapped by the filter 32 and, based on the estimation result, control the engine to regenerate the filter 32.

Figure 2:
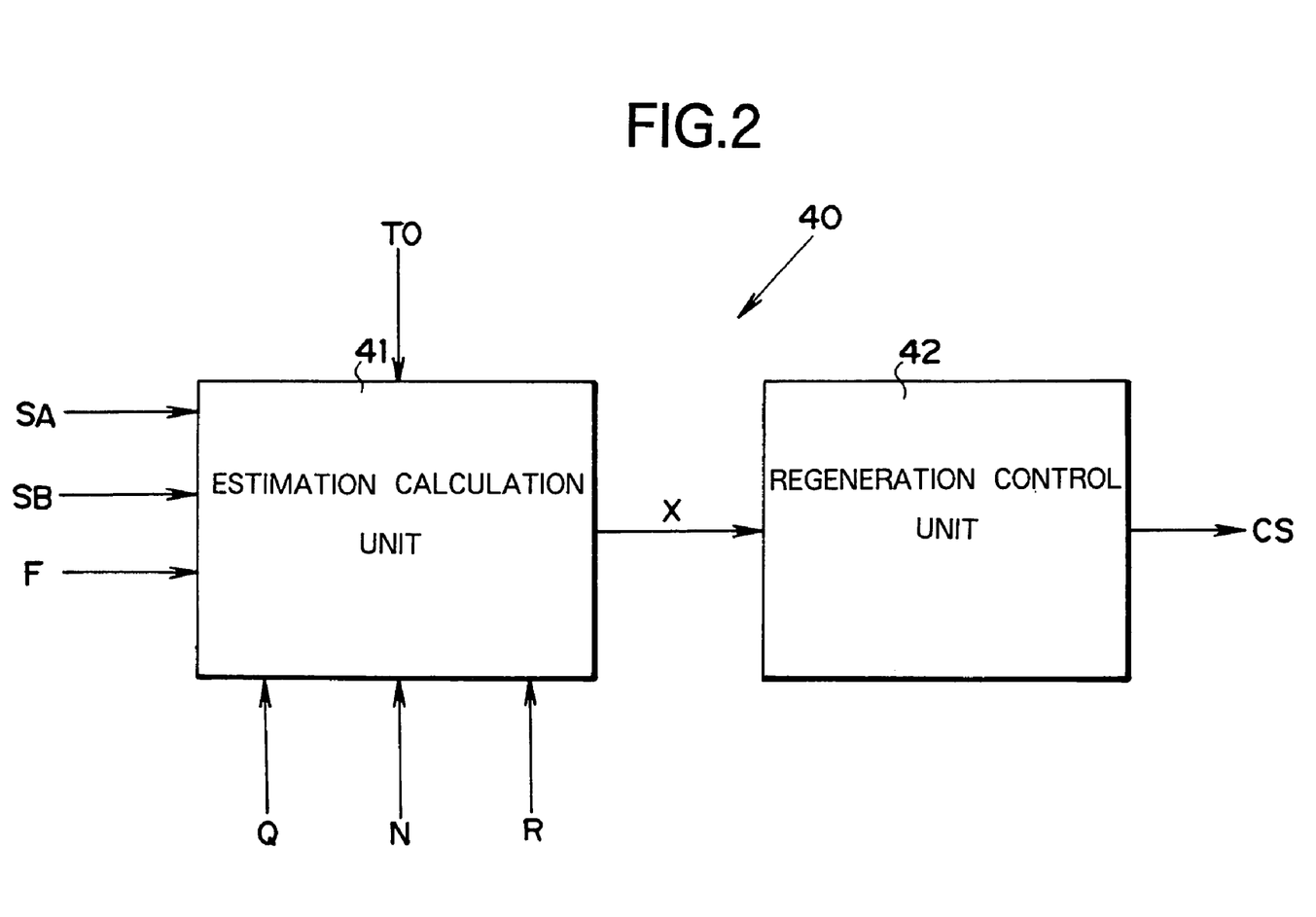
FIG. 2 is a block diagram showing the configuration of the control unit shown in FIG. 1.

FIG. 2 is a block diagram showing the general configuration of the filter control unit 40 shown in FIG. 1. The filter control unit 40 has an estimation calculation unit 41 that performs calculations to estimate the quantity of accumulated particulates in the filter 32 and outputs estimation value data X representing the estimation result, and a regeneration control unit 42 for controlling regeneration of the filter 32 based on the estimation value data X. First pressure signal SA, second pressure signal SB, exhaust flow rate signal F and engine operating data M representing operating conditions of diesel engine 1 are input to the estimation calculation unit 41. A fuel injection amount signal Q representing the operation status of the diesel engine 1, an engine speed signal N and a recirculation ratio signal R representing the exhaust gas recirculation (EGR) rate are engine operating data M that are input from the engine control unit 10; at least one of these signals can be used as engine operating data M. Also input to the filter control unit 40 is a temperature signal T0 representing the inlet temperature of the filter 32 that is transmitted from a temperature sensor 36 provided at the inlet end of the filter 32.

In response to estimation data X, the regeneration control unit 42 determines whether or not the accumulated particulate quantity exceeds than a prescribed value. If according to estimation data X it is determined that the accumulated particulate quantity does exceed the prescribed value, a regeneration signal CS is output from the regeneration control unit 42 and input to the engine control unit 10. In response to the regeneration signal CS, the engine control unit 10 effects the requisite injection timing retardation control for regenerating the filter 32, effecting regeneration of the filter 32 by elevating the temperature of the exhaust gas and burning particulates accumulated in the filter 32.

Figure 3:
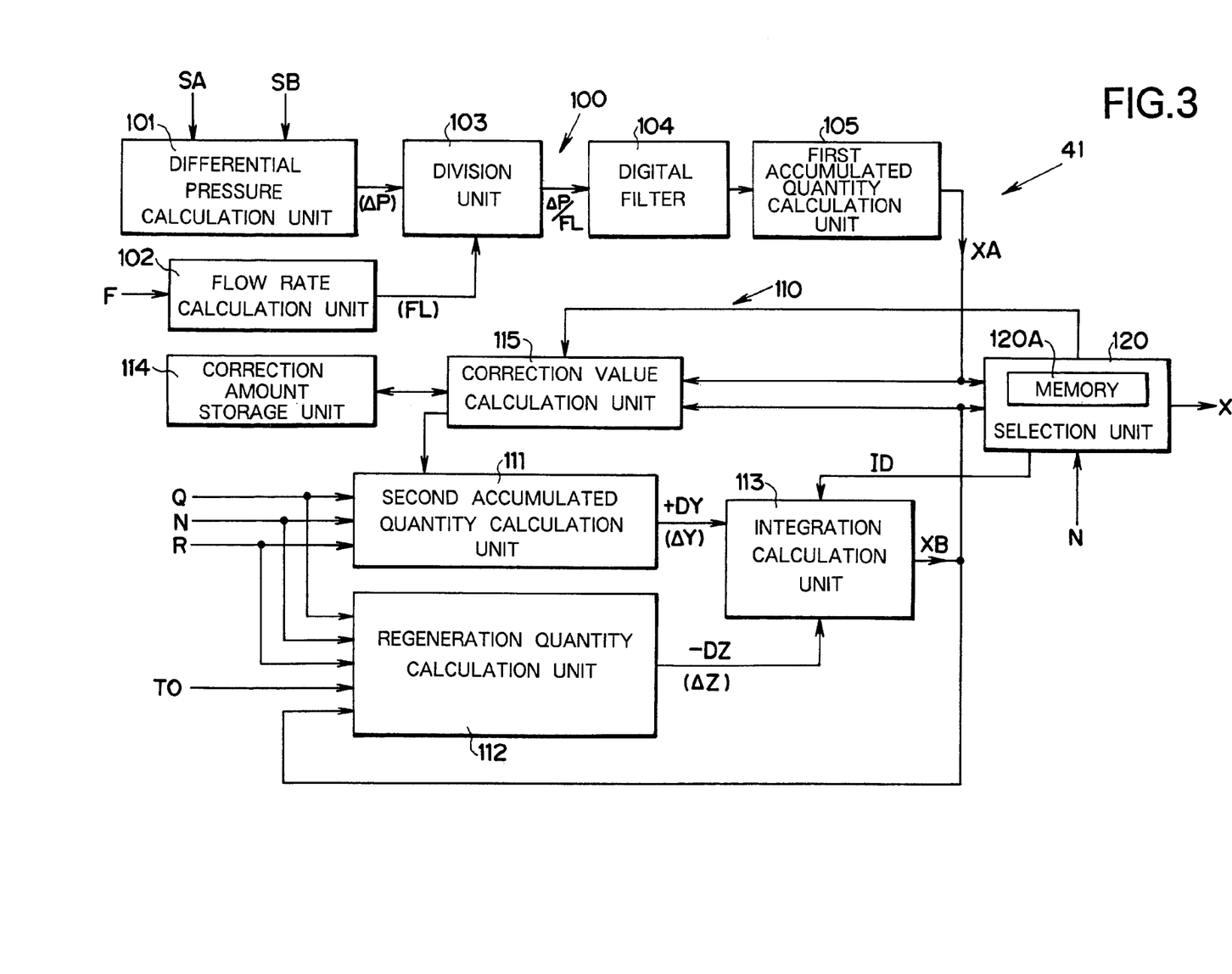
FIG. 3 is a block diagram showing details of the configuration of the estimation calculation unit of FIG. 2.

FIG. 3 is a detailed block diagram of the estimation calculation unit 41. The estimation calculation unit 41 includes a first estimation calculation unit 100 that estimates the accumulated particulate quantity of the filter 32 from the before and after differential pressure of the filter 32, and a second estimation calculation unit 110 that estimates the accumulated particulate quantity of the filter 32 based on the operation status of the diesel engine 1, and uses a selection unit 120 to select the calculation output of either the first estimation calculation unit 100 or the second estimation calculation unit 110, which is then output as the estimation value data X.

The first estimation calculation unit 100 has a differential pressure calculation unit 101 that, in response to the first and second pressure signals SA, SB, calculates the exhaust-gas differential pressure (filter before and after differential pressure) ΔP between the inlet and outlet ends of the filter 32 trapping particulates, and a flow rate calculation unit 102 that, based on the exhaust flow rate signal F from the flow rate sensor 35, calculates the flow rate FL of the exhaust gas flowing in the filter 32. The output of the differential pressure calculation unit 101 and the output of the flow rate calculation unit 102 are input to a division unit 103, and in the division unit 103, calculations are carried out to obtain the value of ΔP/FL. The flow rate calculation unit 102 can also be configured to calculate the flow rate FL by using the operation parameters of the diesel engine 1, as has been already explained.

The result of the calculation by the division unit 103 is input to a first accumulated quantity calculation unit 105 via a digital filter 104, and based on the value of ΔP/FL, the first accumulated quantity calculation unit 105 calculates an estimated value of the accumulated particulate quantity at that time. The result of the estimation calculation obtained by the first accumulated quantity calculation unit 105 is output as first estimation data XA.

An example of the configuration of the first estimation calculation unit 100 has been described in the foregoing. However, the technique of using the filter before and after differential pressure as a basis for calculating an estimate of the quantity of accumulated particulates in a filter is a publicly known one, so the configuration of the first estimation calculation unit 100 shown in FIG. 3 can be replaced by another publicly-known configuration.

The second estimation calculation unit 110 will now be explained. The second estimation calculation unit 110 is configured as a means for calculating an estimation of the accumulated particulate quantity in the filter 32, based on the operation status of the diesel engine 1. The second estimation calculation unit 110 has a second accumulated quantity calculation unit 111 for calculating an estimation of the accumulated particulate quantity in the filter 32, per unit time, based on operating condition data. In this embodiment, the second accumulated quantity calculation unit 111 is configured to use the fuel injection amount signal Q, engine speed signal N and recirculation ratio signal R as a basis for calculating an estimated value ΔY of the accumulated particulate quantity per unit time concerned.

When the temperature of the filter 32 rises in conjunction with the rise in the exhaust gas temperature, particulates accumulated therein are burned, decreasing the accumulated particulates. That is, a filter 32 regeneration operation is carried out. Symbol 112 denotes a regeneration amount calculation unit 112 that in accordance with the operating condition of the diesel engine 1, calculates an estimated value of the amount by which the accumulated particulates are reduced by the burning, which is taken as the amount of the regeneration. In response to the fuel injection amount signal Q, the engine speed signal N, the recirculation ratio signal R, the temperature signal T0, and second estimation data XB obtained as described below, the regeneration amount calculation unit 112 is configured to calculate as an estimated regeneration amount value ΔZ, an estimation of the amount of accumulated particulates in the filter 32 burned per unit time.

The estimated value ΔY of the accumulated particulate quantity per unit time from the second accumulated quantity calculation unit 111, and the estimated regeneration amount value ΔZ per unit time from the regeneration quantity calculation unit 112, are transmitted to an integration calculation unit 113 as accumulation data DY and regeneration data DZ, respectively. From the selection unit 120, initial value data ID representing initial integration values are input to the integration calculation unit 113. The initial value data ID uses estimation value data X values stored in the selection unit 120 at the time of the most recent engine shutdown, as described below. In the integration calculation unit 113, using this initial value data ID, accumulation data DY and regeneration data DZ are subjected to time integration processing at the illustrated polarity. The integration calculation result obtained in the integration calculation unit 113 is the result of the estimation calculation in the second estimation calculation unit 110. That is, second estimation data XB representing an estimate of the accumulated particulate quantity in the filter 32 calculated from the operation status of the diesel engine 1, is output from the integration calculation unit 113.

As described, the second estimation data XB is also input to the regeneration quantity calculation unit 112, which is configured to calculate an estimated regeneration amount value ΔZ per unit time based on the fuel injection amount signal Q, the engine speed signal N, the recirculation ratio signal R, the temperature signal T0 and the second estimation data XB. The reason for taking the second estimation data XB into consideration in the estimation calculation by the regeneration quantity calculation unit 112 is that, even when exhaust gas temperature and other such conditions are identical, the regeneration amount is affected by the quantity of accumulated particulates at that time, so the effect is taken into consideration for a more precise estimation of the regeneration amount.

Also, the respective calculations by the first accumulated quantity calculation unit 105, second accumulated quantity calculation unit 111 and regeneration quantity calculation unit 112 can be implemented as mapping calculations, in which case, by using an actual engine with a filter, setting the prescribed test-bench input conditions beforehand and measuring the accumulated quantity and regeneration amount, the mapping data used in each case can be suitably set based on the results of the measurements.

The selection unit 120 is configured to select either one of first estimation data XA and second estimation data XB, taking into consideration diesel engine 1 operation status and the differential between first estimation data XA and second estimation data XB, and output the selected estimation data as estimation data X representing an estimated value of the quantity of accumulated particulates in the filter 32 at that time.

In this embodiment, engine speed signal N is input to the selection unit 120 as a signal representing the operation status of the diesel engine 1.

Figure 4:
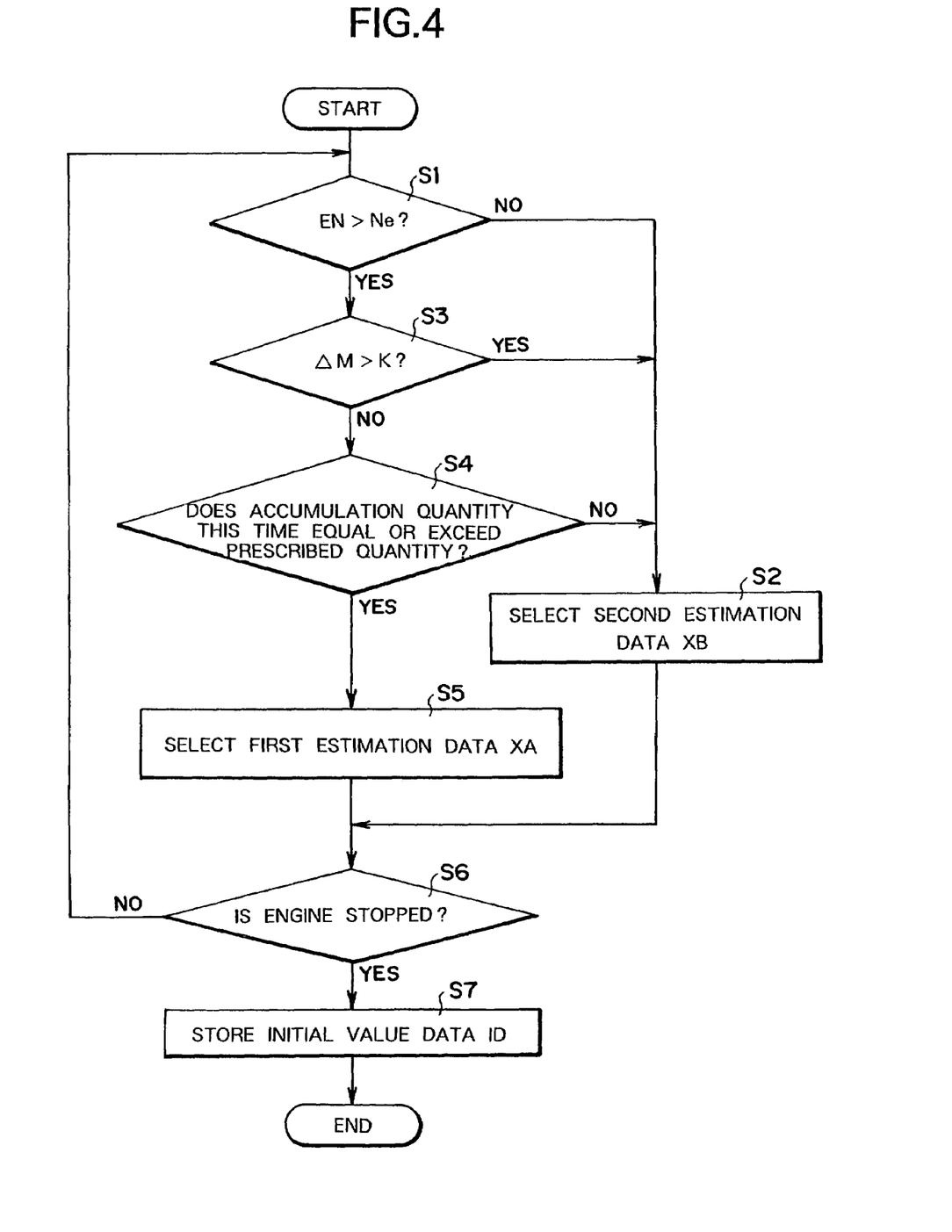
FIG. 4 is a flow chart for explaining the selection unit of FIG. 3.

FIG. 4 is a flow chart for explaining the configuration and operation of the selection unit 120. The selection unit 120 is described below, with reference to FIG. 4. First, in step S1, the engine speed signal N is used to determine whether or not engine speed EN is greater than a prescribed value Ne. The prescribed value Ne represents the lower limit of an engine speed that enables the accumulated particulate quantity to be correctly estimated from the before and after differential pressure of the filter 32. The idling speed, for example, can be set as the prescribed value Ne.

If the engine speed EN is not above the prescribed value Ne, the determination result of step S1 is NO, and the process enters step S2, where second estimation data XB is selected as estimation data X. On the other hand, when the engine speed is greater than the prescribed value Ne, the determination result of step S1 is YES and the process advances to step S3.

In step S3, first estimation data XA and second estimation data XB are compared to determine whether or not the absolute value ΔM of the differential thereof is greater than prescribed value K. In the case of ΔM>K, it is possible that ΔM has become large due to the occurrence of cracking in the accumulated particulates in the filter, and the dependability of the first estimation data XA value is determined to be low. Therefore, if the determination result of step S3 is YES, the process advances to step S2, and second estimation data XB is selected and output as estimation data X. On the other hand, in the case of ΔM☐K, the determination result of step S3 is NO, and the process advances to step S4.

In step S4, it is determined whether or not the quantity of particulates that has accumulated since the diesel engine 1 was started that time has reached a prescribed quantity that is sufficient to repair cracking. The configuration here compares the second estimation data XB value at the time of the most recent engine shutdown with the current second estimation data XB value to determine whether or not the current accumulation quantity is a prescribed quantity or more.

Even when the determination result of step S3 is NO, if the current accumulation quantity is not a prescribed quantity or more, the determination result of step S4 is NO, and the process advances to step S2 and second estimation data XB is selected. On the other hand, if the current accumulation quantity is a prescribed quantity or more, the determination result in step S4 is YES, and the process enters step S5, where first estimation data XA is selected.

In this way, in cases where the engine speed EN is less than the prescribed value Ne, the second estimation data XB is selected as being more dependable than the first estimation data XA.

Also, when the absolute value ΔM of the differential between first estimation data XA and second estimation data XB is greater than K, it is possible that the main factor is the occurrence of cracking in the accumulated particulates in the filter, so in this case too, second estimation data XB is selected as being more dependable.

Even when the determination result of step S3 was ΔM☐K, during the period in which the current accumulation quantity does not reach or exceed the prescribed value, just in case the process enters step S2, and second estimation data XB is selected.

As the accumulated particulate quantity increases with the passage of time from the starting of the engine and the determination result of step S4 becomes YES, first estimation data XA is selected for the first time.

After either first estimation data XA or second estimation data XB has thus been selected, the process enters step S6, where it is determined whether or not the engine has stopped. If the diesel engine 1 has not yet stopped, the determination result in step S6 is NO, the process returns to step S1 and the above-described operation is repeated.

When operation of the diesel engine 1 is stopped, such as by turning the ignition key to OFF, in step S6 the determination result becomes YES, and in step S7, the estimation data X value at this time is stored in memory 120A as initial value data ID, and the operation ends.

However, because integration calculations are performed in the case of the estimation calculations carried out in the second estimation calculation unit 110, it can be foreseen that over the long term, calculation results will become inaccurate due to cumulative error. This being the case, in the example of the embodiment shown in FIG. 3, the second estimation calculation unit 110 is provided with a correction amount storage unit 114 and a correction value calculation unit 115, forming a configuration whereby the quantity of accumulated particulates per unit time calculated by the second accumulated quantity calculation unit 111 is appropriately corrected by means of a learning operation.

That is, in a case in which first estimation data XA and second estimation data XB are input to the correction value calculation unit 115 and the selection unit 120 has selected second estimation data XB, and the speed of the diesel engine 1 is elevated and the selection unit 120 carries out a data switching operation to select first estimation data XA in place of second estimation data XB, in response to this switchover operation, the differential between the first estimation data XA and the second estimation data XB at this time is calculated as follows.

When regeneration processing is not being carried out and the regeneration process integration value is zero, if the differential is within a prescribed range, the ratio DXA/DXB between estimation value DXA derived from the first estimation data XA and estimation value DXB derived from the second estimation data XB is calculated as a deviation coefficient C, and the deviation coefficient C is stored in the correction amount storage unit 114.

If in either case the above differential exceeds the prescribed range, it is determined that the filter is degraded, and the above deviation coefficient C is not calculated. In cases where it is thus determined that a filter is degraded, it is desirable to use a configuration whereby a warning is displayed by predetermined means such as a lamp that comes on or flashes to urge the operator to replace the filter.

The deviation coefficient C is stored in the correction amount storage unit 114 as a learning value and transmitted as a learning value to the second accumulated quantity calculation unit 111, where the accumulated particulate quantity per unit time calculated therein is corrected by being multiplied by the deviation coefficient C, after which the corrected accumulated particulate quantity per unit time output as the estimated value ΔY of the accumulated particulate quantity per unit time.

In this way, in the correction value calculation unit 115 first estimation data XA and second estimation data XB values are used to calculate the deviation coefficient C, the deviation coefficient C is stored in the correction amount storage unit 114, and by appropriately carrying out corrections in the course of calculation processing carried out to calculate the accumulated particulate quantity per unit time, errors in the integration calculations by the integration calculation unit 113 are corrected and do not accumulate. As a result, the second estimation data XB, which is estimation data based on the quantity of accumulated particulates per unit time, becomes a value that has dependability, so accumulated particulate quantity estimations are accurate.

Thus, with this configuration, when either one of the estimation results of the first and second estimation calculation units is selected, the deviation amount of the two estimation results is calculated and the deviation amount is stored as a learning value, so that by correcting values calculated in the second estimation calculation unit in accordance with this learning value, the accumulated particulate quantity is estimated with more accuracy.

The filter control unit 40 is configured as in the above, so that of two estimation values, comprised by an accumulated particulate quantity estimation value calculated on the basis of the filter before and after differential pressure, and a simulated accumulated particulate quantity estimation value based on the operation status of the diesel engine 1, the estimation value having the higher dependability according to the status at that time is selected. And, whether or not to regenerate the filter 32 is determined in accordance with the estimation value thus selected, so regeneration of the filter 32 can be implemented at a highly appropriate timing. As a result, compared to previously, the life of the filter 32 can be extended, so it can be expected that running costs can be reduced.

As described in the foregoing, of two estimation values, which are an accumulated particulate quantity estimation value calculated based on the filter before and after differential pressure, and a simulated accumulated particulate quantity estimation value based on accumulated particulate quantity per unit time, the estimation value having the higher dependability according to the engine operation status at that time is selected, and whether or not to regenerate the filter is determined in accordance with the estimation value thus selected, so regeneration of the filter can be implemented at a highly appropriate timing. As a result, the filter regeneration frequency can be optimized and the life of the filter can be extended compared to before, so it can be expected that running costs can be reduced.

INDUSTRIAL APPLICABILITY

As set out in the foregoing, the filter control apparatus of the present invention is useful for regenerating filters at a suitable timing.

The invention claimed is:

1. In a filter control apparatus that estimates an accumulated particulate quantity in a filter for trapping particulates contained in engine exhaust gas and regenerates the filter based on the estimation result,
   a filter control apparatus that includes detection means for detecting the engine operation status,
   first estimation means that estimates an accumulated particulate quantity of the filter based on a before and after exhaust-gas differential pressure of the filter,
   second estimation means that estimates an accumulated particulate quantity of the filter based on the engine operation status,
   selecting means that selects either of the estimation results of the first and second estimation means in response to the differential calculation means and detection means, and
   means that, when selecting either of the estimation results of the first and second estimation means, calculates deviation amount between the two estimation results, stores the deviation amount between the two estimation results, stores the deviation amount as a learning value, calculates data for correcting the second estimation means in accordance with the learning value and supplies the data to the second estimation means, and determines regeneration timing of the filter in accordance with the selected estimation result selected by the selecting means.

2. A filter control apparatus as claimed in claim 1, wherein in the second estimation means, calculation is carried out for estimating an accumulated particulate quantity based on at least one from among quantity of fuel injected to the engine, engine speed, ratio of exhaust gas recirculation in the engine, and filter before temperature.

3. A filter control apparatus as claimed in claim 1, wherein in the second estimation means, estimation calculation of accumulated particulate quantity is carried out using mapping calculation employing measured data obtained by measuring accumulated particulate quantity increase per unit time using an actual engine.

4. A filter control apparatus as claimed in claim 3, wherein the second estimation means is configured to obtain estimated values of accumulated particulate quantity in the filter by integrating data obtained by the mapping calculation.

5. A filter control apparatus as claimed in claim 4, wherein estimated values of accumulated particulate quantity used in filter regeneration control each time the engine is stopped are stored and the stored accumulated particulate values are used as initial values for integration in the second estimation means.

6. A filter control apparatus as claimed in claim 1, wherein a coefficient is calculated in accordance with the amount of deviation and the coefficient is used to correct calculated values in the second estimation means.

7. A filter control apparatus as claimed in claim 1, wherein when the deviation amount exceeds a prescribed value, a gist thereof is displayed to the operator.

8. A filter control apparatus as claimed in claim 1, wherein when the differential when the engine is started equals or exceeds a prescribed value, the estimation result of the second estimation means is selected regardless of the detection result of the detection means.

9. A filter control apparatus as claimed in claim 1, wherein when the differential when the engine is started equals or exceeds a prescribed value, the estimation result of the second estimation means is selected within a prescribed time period regardless of the detection result of the detection means.

10. A filter control apparatus as claimed in claim 9, wherein the prescribed time period is a period of time from the staffing of the engine to a time at which estimated accumulated particulate quantity estimated from the staffing of the engine reaches a prescribed value.

11. A filter control apparatus as claimed in claim 8, wherein in a case in which the differential has become smaller than a prescribed value, an estimation result of the first estimation means is used instead of an estimation result of the second estimation means.

* * * * *